April 10, 1973  A. M. R. DIFFORD ETAL  3,726,774
CONTROL OF NUCLEATION AND CRYSTALLISATION FROM SOLUTIONS BY
CONTROLLING PRODUCTS OF IONISING RADIATION
Filed May 31, 1968

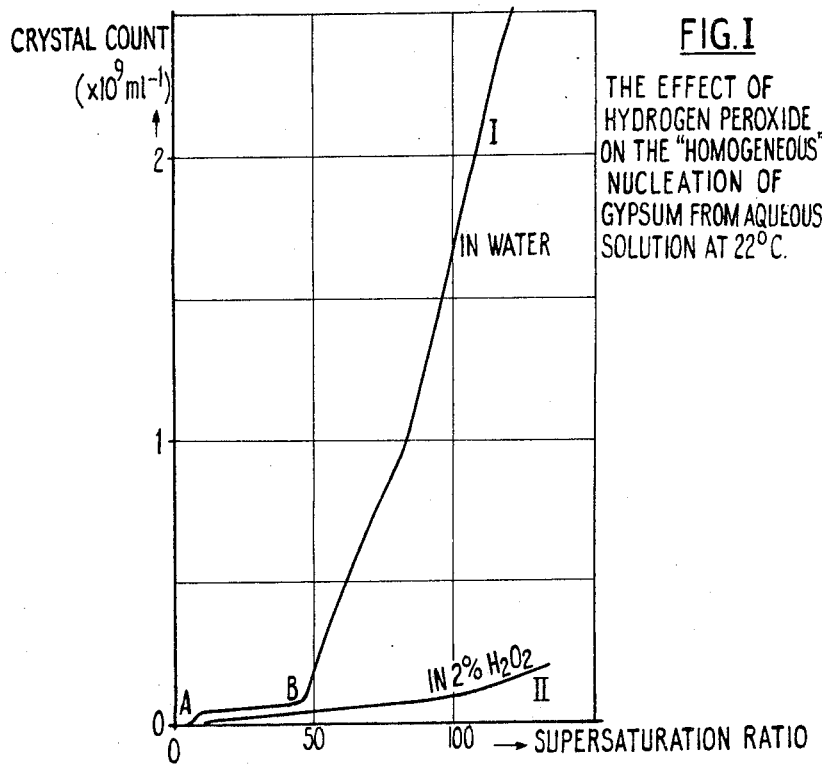

FIG. I
THE EFFECT OF HYDROGEN PEROXIDE ON THE "HOMOGENEOUS" NUCLEATION OF GYPSUM FROM AQUEOUS SOLUTION AT 22°C.

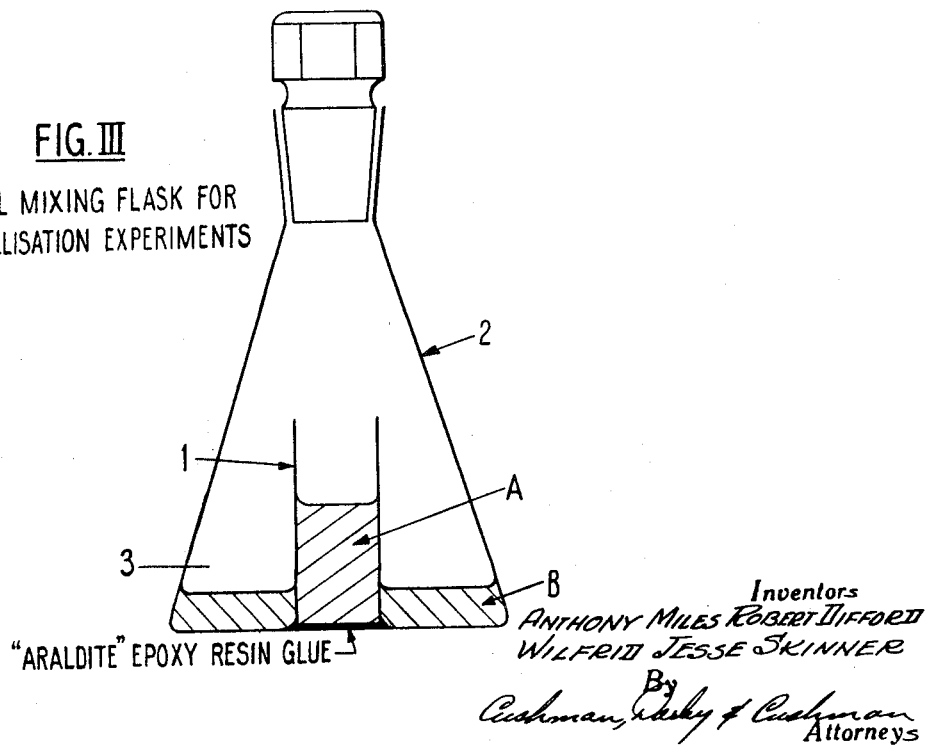

FIG. III
SPECIAL MIXING FLASK FOR CRYSTALLISATION EXPERIMENTS

"ARALDITE" EPOXY RESIN GLUE

Inventors
ANTHONY MILES ROBERT DIFFORD
WILFRID JESSE SKINNER

By
Cushman, Darby & Cushman
Attorneys

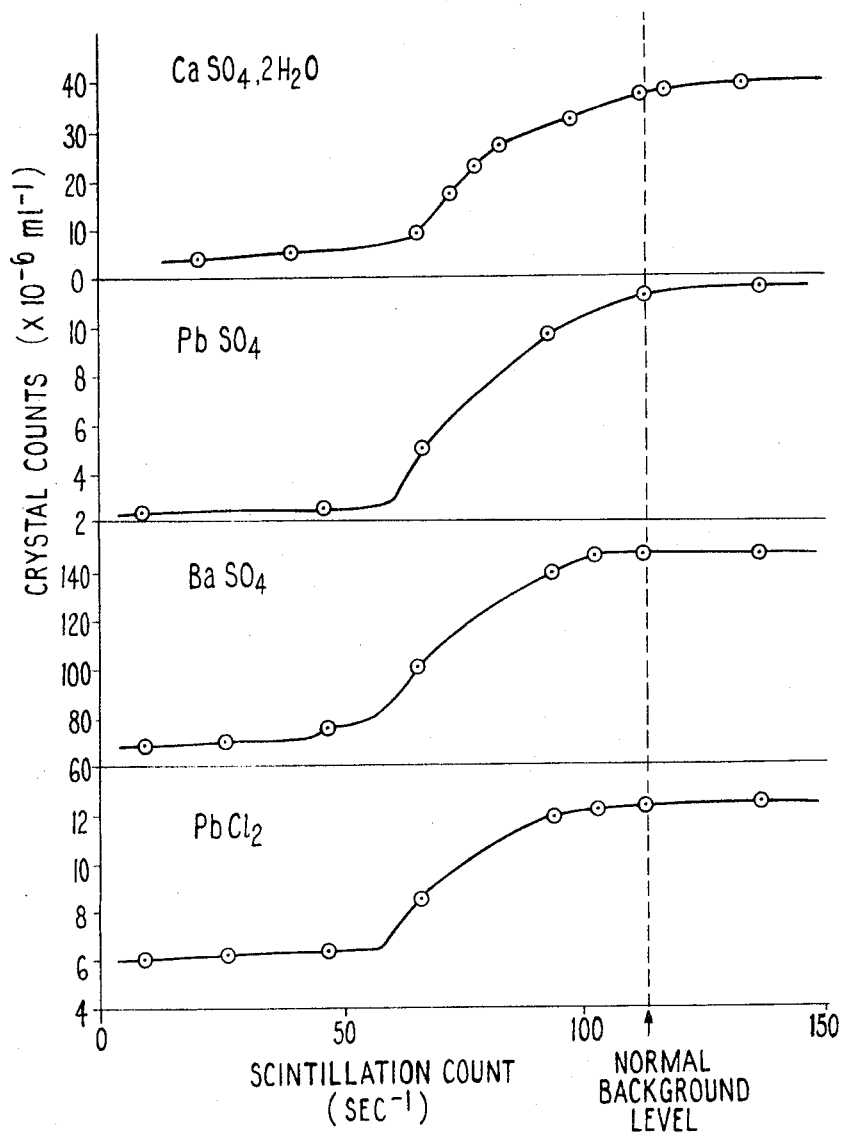
FIG. II
THE EFFECT OF LOW RADIATION LEVELS ON THE PRECIPITATION OF FOUR SALTS

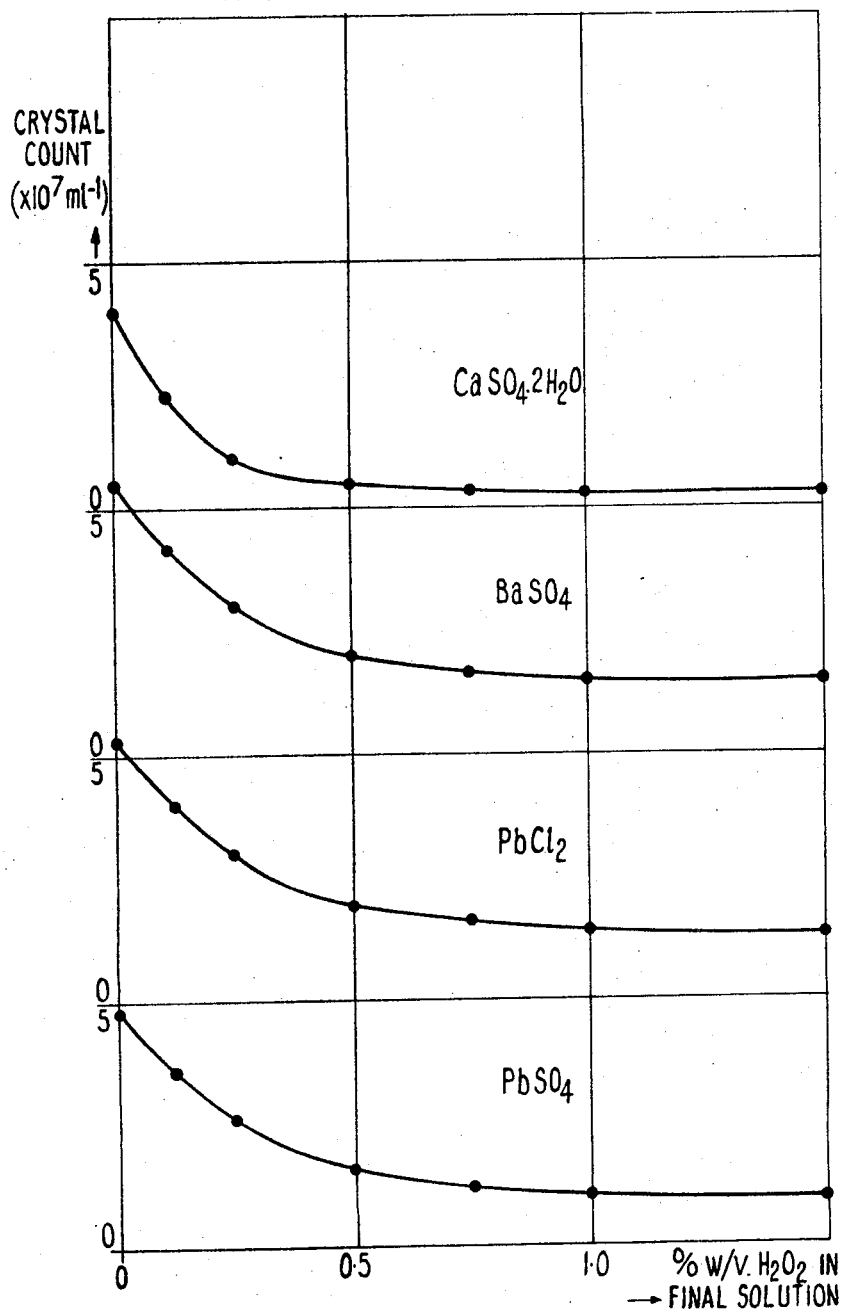
FIG. IV
THE EFFECT OF HYDROGEN PEROXIDE ON THE PRECIPITATION OF SEVERAL SPARINGLY SOLUBLE SALTS

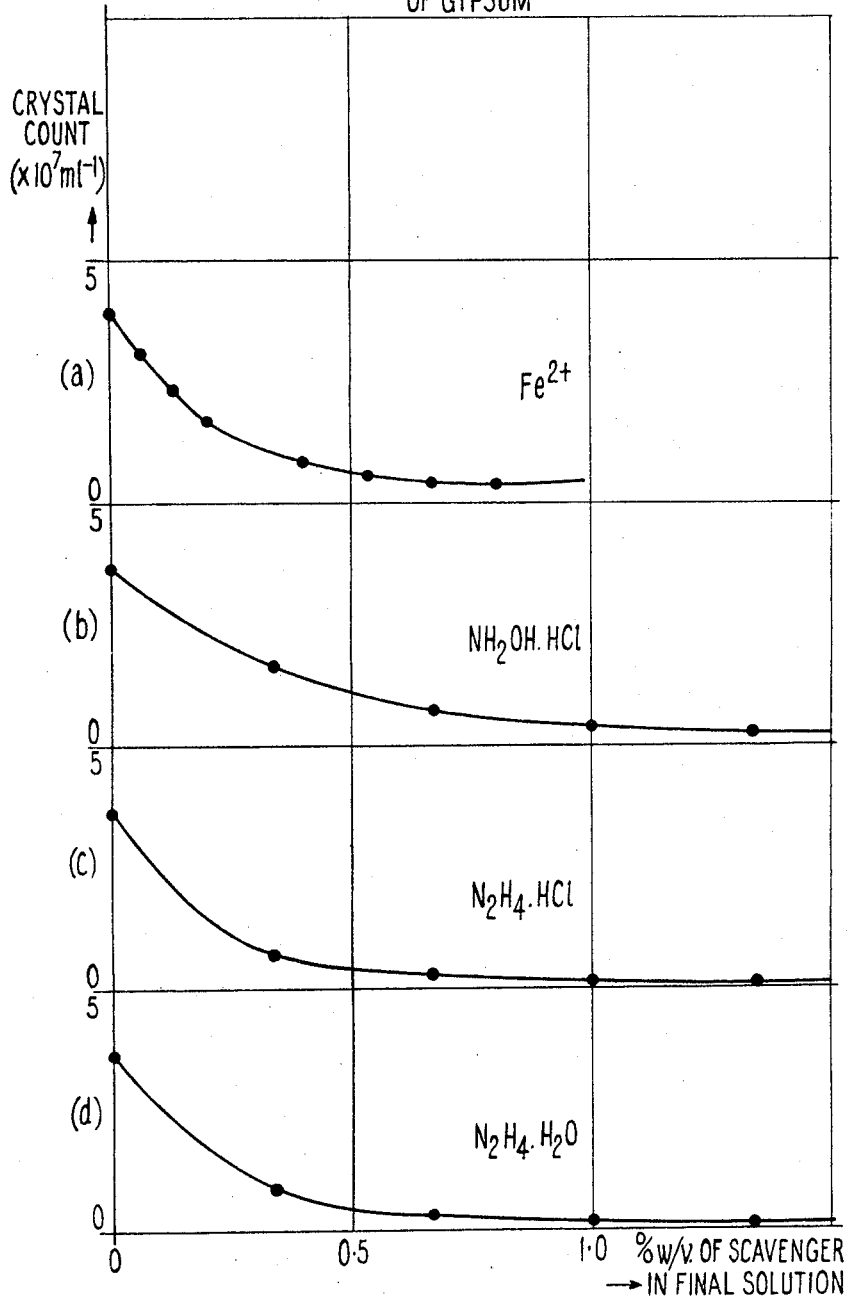

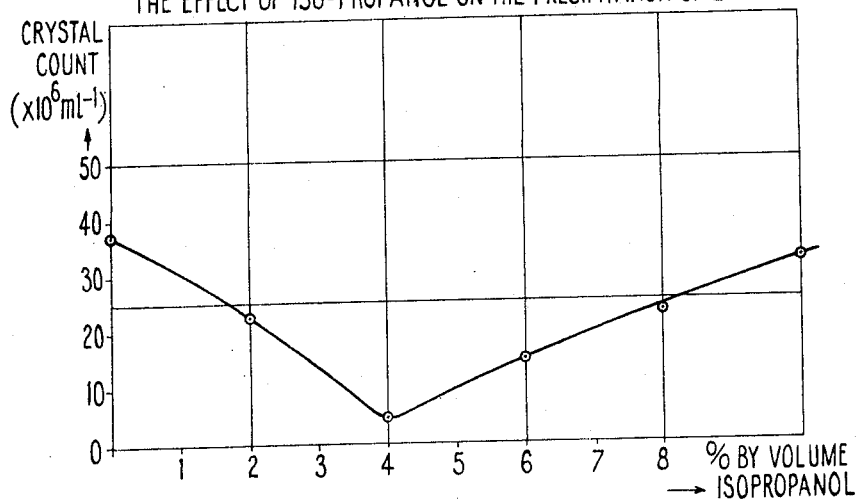
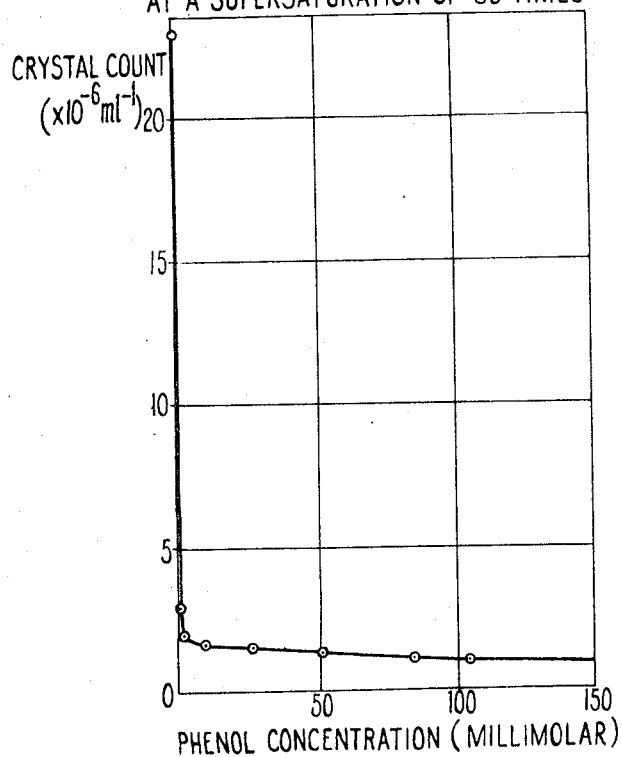

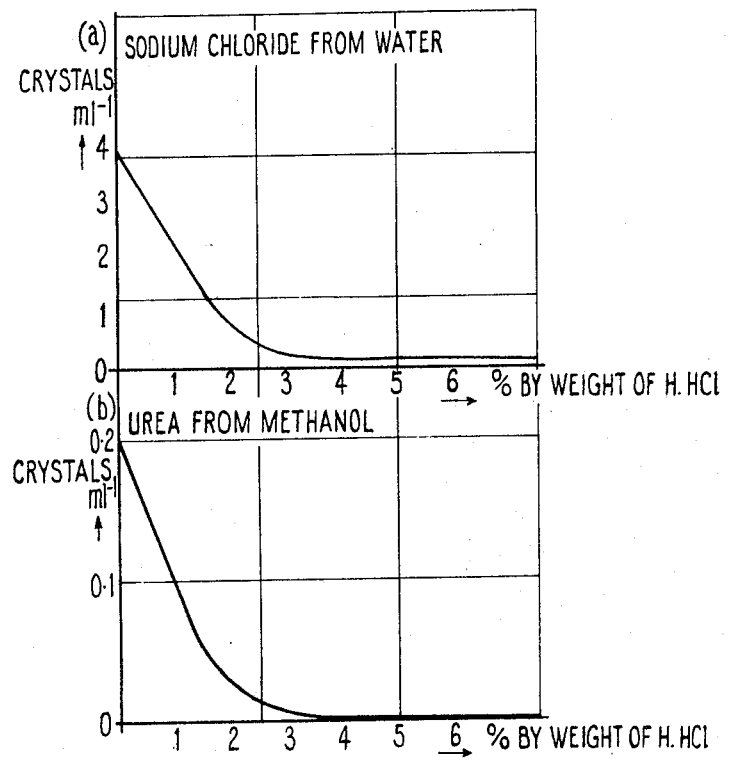
FIG. VII
THE EFFECT OF HYDROXYLAMINE HYDROCHLORIDE ON TWO CRYSTALLISATION PROCESSES

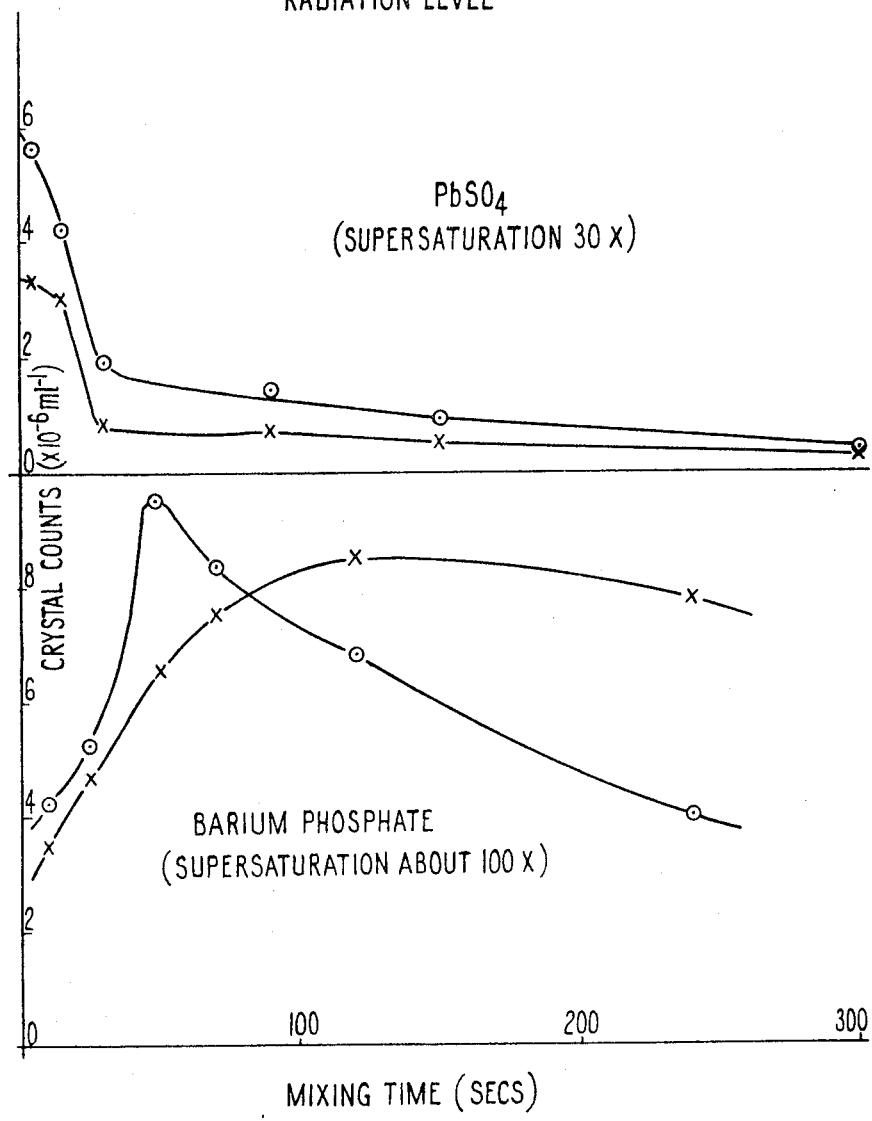
FIG. VIII
THE EFFECT OF TOTAL MIXING TIME ON THE FINAL CRYSTAL COUNT United States Patent Office 3,726,774
Patented Apr. 10, 1973

3,726,774
CONTROL OF NUCLEATION AND CRYSTALLISATION FROM SOLUTIONS BY CONTROLLING PRODUCTS OF IONISING RADIATION
Anthony Miles Robert Difford and Wilfrid Jesse Skinner, Norton-on-Tees, England, assignors to Imperial Chemical Industries Limited, London, England
Filed May 31, 1968, Ser. No. 733,417
Claims priority, application Great Britain, June 6, 1967, 25,997/67
Int. Cl. B01j 1/10
U.S. Cl. 204—157.1 R
26 Claims

ABSTRACT OF THE DISCLOSURE

The primary nucleation of solids from solutions is controlled by controlling the concentration of the products of irradiation in the solution; fewer (and larger) crystals are obtained by reducing the level of ionising radiation to which the solution is exposed or by the addition of free-radical scavengers; more (and smaller) crystals are obtained by increasing said level of ionising radiation or by generating products of irradiation, such as free radicals, in the solution.

---

This invention relates to the primary nucleation, and subsequent crystallisation, of solids from solutions.

All crystallisation processes take place in two well-recognised consecutive stages. The first stage, known as nucleation, is the formation of sub-microscopic particles of the crystallising phase. The second stage is simply the growth of these initial particles (nuclei) into larger crystals.

Nucleation occurs in two broad ways, one of which usually predominates in any given set of conditions. Nuclei can be formed from the dissolved phase by aggregation of single ions, in pairs, molecules, etc. (primary nucleation). This may take place in the bulk of the solution or at the interface of the solution and a solid material different from the crystallising phase (see below). Alternatively, nuclei can be formed from existing crystals (secondary nucleation) by fracture, abrasion or in other ways. This invention relates only to primary nucleation, except insofar as secondary nucleation in some systems is a function of the properties of crystals grown on primary nuclei.

According to generally accepted theories of crystal nucleation, an expenditure of energy (activation energy) is necessary for a nucleus to grow to its critical size, i.e. such a size that further growth is then accompanied by a decrease in free energy and is therefore spontaneous. The existence of this activation energy is attributed to the predominating effect, at very small particle sizes, of the interfacial energy between the new phase and the phase (melt, solution or vapour) from which it crystallises. The sources of the activation energy are (a) the finite supersaturation essential for crystal formation to occur at a sensible rate in any crystallising system and (b) random (thermal) energy of the molecules, ions etc. comprising the system. Two types of primary nucleation are recognised, namely homogeneous primary and heterogeneous primary nucleation. The former type requires a higher supersaturation than the latter and takes place independently of solid surfaces such as those provided by vessel walls, pre-existing crystals of the new phase and adventitious particulate impurities. Heterogeneous primary nucleation, on the other hand, takes place on the surfaces of solids of the type just mentioned and will proceed at a sensible rate at lower supersaturations than homogeneous primary nucleation. Current theory ascribes this to a similarity between the structural arrangement of the ions or molecules in the surface of the nucleation centre and the crystallographic structure of the crystallising phase, i.e. the nucleation centre reduces the amount of work to be done against surface forces in forming a nucleus.

An illustration of the foregoing brief description of the two main types of primary nucleation is provided by curve I in FIG. I of the accompanying drawings which shows the number of crystals formed per millilitre of solution, as a function of supersaturation, for the precipitation of gypsum from aqueous solution at room temperature and under normal laboratory conditions. The portion AB of the curve corresponds to the generally accepted region of heterogeneous nucleation in which the number of crystals is a weak function of supersaturation. Point B corresponds to the critical supersaturation for the onset of homogeneous nucleation and beyond this the number of crystals increases very rapidly with increasing supersaturation.

We have now discovered that in crystallisations from solutions, the number of active nucleation centres is strongly influenced by the intensity of the ionising radiation to which the crystallising system is exposed and the time of such exposure immediately before the supersaturation, which leads to nucleation, is developed. This is illustrated in FIG. II which shows the number of crystals/ml. in the precipitation of gypsum, lead sulphate, barium sulphate and lead chloride from aqueous solutions, at constant initial supersaturation, as a function of the intensity of ionising radiation to which the system was exposed before and during the precipitation operation. (Essential experimental details are given in Example 1 hereinafter.) The important feature of this result is that the number of crystals is substantially reduced when the intensity of ionising radiation is reduced below that normally obtaining on land surfaces of the earth; by reducing the radiation intensity to about ½ to ⅕ of its normal background level, the number of crystals/ml. in these particular systems was reduced by a factor of from about 2 up to a factor of about 8 or 10. (Further cases of similar reductions are given in Examples 2, 3, 8, 9 and 13.) As will be seen from FIG. II, this experiment was carried out at normal background radiation level (which on most of the land surface of the earth corresponds to an ionising radiation dose rate of about 0.005 mrads./hr.) and increasing the intensity of ionising radiation above the normal background level had little effect on the number of crystals; on the other hand, had the experiment been carried out against a background radiation level of, say, one-fifth or one-half normal (corresponding respectively to an ionising radiation dose rate of about 0.001 to 0.0025 mrads./hr.), an increase in the intensity of ionising radiation above this level would have considerably increased the number of crystals. In fact, in the particular systems of FIG. II, there was little effect upon reducing the radiation level to below ⅓ normal (i.e. below about 0.0015 mrads./hr.) and not a great deal of effect upon reducing it to below ½ normal (i.e. below about 0.0025 mrads./hr.).

We have also found that the number of crystals formed can be significantly reduced, even in the presence of normal background ionising radiation, by the addition to the nucleating system of relatively small quantities of scavengers, i.e. substances capable of reacting rapidly with the products of irradiation (such as free radicals, in particular free OH radicals) in the nucleating system. This phenomenon is illustrated in Examples 4 to 11 and 13 hereinafter. My this means it is possible to reduce the number of crystals formed in the nucleating system to at least the level attainable by reducing the intensity of the ionising radiation to which the nucleating system is exposed. Conversely, if the total number of crystals in a given system is below the limiting value obtaining at substantially normal background radiation levels, either as a result of radiation shielding or the presence of scavengers, then the generation of the appropriate products of irradiation, e.g. free radicals, in particular free OH radicals, by means other than ionizing radiation can raise the crystal number up to such limiting value. Possible methods of generation of such products of irradiation include solvent photolysis (e.g. formation of free OH radicals in water by far U.V. photolysis), photolysis or thermal decomposition of added sensitisers (e.g., $H_2O_2$ or organic peroxides) and chemical reaction between pairs of added sensitisers (e.g. radical formation by reaction between ferrous ion and $H_2O_2$). Solute molecules or ions may also participate in these reactions.

The phenomena described above relate to systems in which the supersaturation lies well within the region of heterogeneous nucleation, in the accepted sense. We have further shown, however, that the critical supersaturation for homogeneous primary nucleation is considerably raised by the addition of scavengers such as hydrogen peroxide (see curve II, FIG. I) as well as by a reduction of the ionising radiation intensity. In the supersaturation region immediately above the normally accepted critical value, a still more drastic reduction of the number of crystals formed is therefore possible.

Nuclei are so much smaller than the crystals which grow on them that nucleus formation does not cause a perceptible decrease in supersaturation. Thus, as long as crystal growth is negligible before the theoretical initial conditions for crystal growth are reached (i.e. reagent mixing, change in solution temperature, etc.), nucleation will take place, at least in part, at the supersaturation calculable for these initial conditions. Nucleation occurring during the rise of supersaturation does not prevent the attainment of the full theoretical value. Under these conditions, the influence of radiation or free radical generation on crystal count is always as described above, i.e., below a limiting level, an increase in radiation intensity leads to an increase in crystal count.

If the attainment of supersaturation is slow enough, however, both primary nucleation and crystal growth are measurable during this period. The maximum supersaturation reached is then less than the theoretical value and is determined by the rates of change of conditions (i.e. of reagent addition, temperature change, etc.), of primary nucleation and of crystal growth. The final crystal count, therefore, is also dependent in a complex way on these three factors. The influence of rate of primary nucleation on final crystal count is not simple: a high rate of primary nucleation will in general give a high crystal count, but a high rate of primary nucleation in the early stages can (by promoting fast crystal growth and hence solute removal) lower the maximum supersaturation reached. In the latter case the nucleation rate never rises to the maximum value and so the final crystal count can be reduced by an *increase* in initial nucleation rate.

In all the systems we have examined the sensitivity of the final crystal count to products of irradiation is changed in a manner characteristic of the precipitating system by slowing down the rate of achievement of supersaturation. With some systems the radiation effect reverses at sufficiently slow approaches to supersaturation, i.e., under these conditions a reduction in radiation intensity increases the total crystals. There seems to be no general criterion for predicting whether inversion will occur with a given crystallizing system. As the final crystal count is a function of rate of approach to supersaturation, rate of nucleation, rate of crystal growth and concentration of products of irradiation, it is not surprising that no simple predictive rules can be applied.

One further point can be made. If a crystallizing system is such that the rate of approach to supersaturation falls in this region when it affects crystal count, the rate itself is another control parameter. This parameter can then be used in conjunction with the various techniques for maintaining the concentration of products of irradiation to give the required crystal size or count.

Exposure to ionising radiation causes the establishment of very small but definite stationary concentrations of products of irradiation. In the case of water, these products include OH radicals, H atoms, hydrated electrons and hydrogen peroxide. The overall mechanism remains obscure, but certain aspects have been clarified. Experiments with added materials which react selectively with various products of irradiation (scavengers) have shown that of the various water radiolysis products the hydroxyl radical is of dominant importance in determining crystal count. This appears to be generally true for all aqueous crystallizations. Interaction of OH radicals, the solute and, in the case of heterogeneous nucleation, the heterogeneous substrate, gives rise to the crystal nucleus by steps which remain unknown.

This invention accordingly provides a method of controlling the primary nucleation of solids from solutions by controlling the concentration of the products of irradiation in the nucleating system. The technical properties of many solid materials are dependent on the size of the crystals of which the solids are composed, and since the size of the crystals is directly determined by the number of crystals which are formed during the crystallisation, the present invention therefore also provides a method of controlling the size of the crystals.

The invention further provides a method of controlling the primary nucleation of solids from solutions by controlling the level of ionising radiation to which the nucleating system is exposed, for example by adjusting the level of ionising radiation to which the nucleating system is exposed so that the ionising radiation dose rate to the nucleating system has a preselected value which is preferably between about 0.001 and 0.005 mrads./hr., and more preferably between 0.0015 and 0.005 mrads./hr. In one embodiment of this method, the number of crystals in the nucleating system is reduced by decreasing the level of background ionising radiation to which the nucleating system is exposed, preferably so that the ionising radiation dose rate to the nucleating system has a preselected dose rate which is preferably not less than about 0.001 mrads./hr., and more preferably not less than about 0.0015 mrads./hr., for example by providing an appropriate amount of radiation shielding around the nucleating system. In a further embodiment of this method, which is applicable where the initial ionising radiation dose rate to the nucleating system is less than about 0.005 mrads./hr., the number of crystals in the nucleating system is increased by increasing the level of ionising radiation to which the nucleating system is exposed, preferably so that the ionising radiation dose rate to the nucleating system has a preselected value, which preferably does not exceed about 0.005 mrads./hr., by providing one or more additional sources of ionising radiation external to the nucleating system and/or within the nucleating system itself. In the latter case, there may be arranged within the nucleating system one or more lattices of radiation sources (such as cobalt-60) or a trace of one or more suitable radioactive elements may be introduced into the nucleating system itself. Increasing the level of ionising radiation to which the nucleating system is exposed is normally only of particular importance where the latter is enclosed within a large industrial vessel (such as a crystallisation vessel) at the centre of which the normal background radiation is much reduced, partly through absorption by the wall of the vessel and partly through absorption by the outer layers of the nucleating system; the provision of additional sources of ionising radiation, whether internally or externally or both, has the effect of increasing the number of crystals in the vessel and therefore, in the case of crystallisation from a solution, of producing crystals of reduced size (which can be important, for example, in the precipitation of active solids for use as adsorbents, catalysts, etc.). The use of an additional source of ionising radiation within the nucleating system itself has the additional advantage that by compensating, at least in part, for the reduction by absorption of the normal background radiation, it tends to cause the crystals to be more evenly distributed throughout the vessel and therefore in the case of crystallisation from a solution, to produce crystals of a more even size.

The invention further provides a method of obtaining from a given solution, under given conditions, crystals having a predetermined size within a preselected range, which comprises the steps of preselecting, maintaining, and where necessary adjusting, the level of ionising radiation obtaining within the crystallisation vessel, at or to a predetermined value such as to produce crystals of said predetermined size. As described above, said adjustment may be effected by providing a predetermined amount of radiation shielding around the crystallisation vessel, or providing a predetermined amount of additional external and/or internal radiation to maintain the preselected level of ionising radiation within the crystallisation vessel required to produce crystals of said predetermined size. Furthermore, the dimensions, design and/or material of the crystallisation vessel may be preselected, having regard to the background ionising radiation, so as to maintain within the vessel the preselected level of ionising radiation required to produce crystals of said predetermined size.

The invention further provides a method of controlling the primary nucleation of solids from solutions which comprises adding to the nucleating solution one or more scavengers capable of reacting rapidly with the products of irradiation in the solution. By thus reducing the concentration of the products of irradiation in the solution, the number of crystals in the solution is correspondingly reduced and the size of the crystals correspondingly increased. The invention therefore further provides a method of obtaining from a given solution, under given conditions, crystals having a predetermined size within a preselected range, which comprises the step of adding to the solution one or more of said scavengers in an amount sufficient to reduce the number of crystals in the solution to a predetermined level such as to produce crystals of said predetermined size.

In the case of aqueous solutions, the products of irradiation include OH radicals, H atoms, hydrated electrons and hydrogen peroxide. It is possible that scavengers capable of reacting with H atoms and hydrated electrons have some effect, but the most efficacious scavengers are those capable of reacting with free OH radicals. The efficiency of a scavenger can be related directly to its rate constant for reaction with OH radicals. The concentration of scavenger required in a given crystallizing system to change the crystal count by a given amount is inversely proportional to the rate constant. Thus suitable scavengers can be selected from the published lists of rate constants for the reaction of various materials with hydroxyl radicals (e.g. "rate constants of hydrated electrons, hydrogen atoms and hydroxyl radicals in aqueous solution" by M. Anlsar and P. Neta (Israel Atomic Energy Commission, 1966)). Typical scavenger materials of high efficiency are those which can easily transfer an electron to a free hydroxyl radical (e.g. $Fe(CN)_6^{4-}$, $Fe^{2+}$, $I^-$, $NO_2^-$, and compounds of the lower valency states of variable valency elements, especially the transition metals such as iron, cerium and titanium) and those which react by addition to free hydroxyl radicals (e.g. phenol, quinol and most aromatic compounds). Materials which react with free hydroxyl radicals by hydrogen abstraction (e.g. hydrogen peroxide, hydrazine, hydroxylamine and their salts, and secondary alcohols such as isopropanol) also function as scavengers, but generally with lower efficiency than the two previous classes.

The invention further provides a method of controlling the primary nucleation of solids from solutions which comprises the step of generating, within the solution, products of irradiation, for example free radicals, in particular free OH radicals, by means other than ionising radiation. By thus increasing the concentration of the products of irradiation in the solution, the number of crystals in the solution is correspondingly increased and the size of the crystals correspondingly reduced. The invention therefore further provides a method of obtaining from a given solution, under given conditions, crystals having a pre-determined size within a preselected range, which comprises the step of generating within the nucleating solution, in an amount sufficient to increase the number of crystals in the solution to a predetermined level such as to produce crystals of said predetermined size, products of irradiation, for example free radicals, in particular free OH radicals, by means other than ionising radiation, for example by one or more of the methods described hereinabove.

For simplicity we have used the general term "ionising radiation" hereinabove. There is no doubt that, in phenomenon, $\mu$-rays are by far the most important compent of the background radiation. In the control of crystal size by supplying additional radiation with a lattice of radioactive sources it would be preferable to employ $\gamma$-emitters. (This is the preferred method.) Where a radioactive element is dissolved in the solution, however, the use of $\alpha$, and particularly $\beta$, emitters is possible.

The invention is exemplified by the following Examples 1 to 13, which are by no means exhaustive:

EXAMPLE 1

Two aqeuous solutions were made up from reagent grade salts in distilled water. Solution A contained 7 g. of hydrated calcium nitrate ($Ca(NO_3)_2 4H_2O$) per 100 ml. and solution B 4 g. of sodium sulphate ($Na_2SO_4$ anh.) per 100 ml. 5 ml. of solution A were pipetted into the centre tube 1 of the special flask 2 shown in FIG. III and 5 ml. of solution B into the annular space 3 surrounding the centre tube 1. The flask was equilibrated for a few minutes at 22° C. in an environment of low background radiation (an iron "castle" 2 inches thick in a concrete cellar).

The precipitation was then initiated by inverting the flask and allowing the two solutions to mix rapidly while being gently swirled.

$$Ca(NO_3)_2 + Na_2SO_4 + 2H_2O \rightarrow CaSO_4 2H_2O \downarrow 2NaNO_3$$

The flask was left in its environment for half an hour to complete crystal growth. In this period a total $\gamma$-radiation count was made close to the experiment by means of a 1" x 1.75" sodium iodide scintillation counter manufactured by "Nuclear Enterprises Ltd." This counter will count the total $\gamma$-spectrum above about 50 kev. energy.

The experiment was repeated several times using different radiation shields and a weak cobalt-60 $\gamma$-ray source to vary the incident radiation level. The flasks were then removed and the number of crystals formed were counted by taking a small dispersed sample in a conventional blood-count cell (haemacytometer) and counting under the microscope.

The effect of $\gamma$-radiation on the concentration of gypsum crystals formed is displayed in FIG. II. This figure also includes the results obtained from several similar experiments on the precipitations of lead and barium sulphates and of lead chloride from aqeuous solutions.

EXAMPLE 2

Solutions C and D were made up in distilled water and contained respectively 0.1 g. lead nitrate ($Pb(No_3)_2$ anh.) and 0.4 g. sodium sulphate ($Na_2SO_4$ anh.) per 100 ml. Two special flasks were filled with these precipitants as in Example 1. One flask was mixed at ground floor level above the cellar in which the second flask was mixed

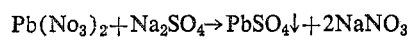

$$Pb(No_3)_2 + Na_2SO_4 \rightarrow PbSO_4 \downarrow + 2NaNO_3$$

On the surface $4.4 \times 10^7$ crystals per ml. were formed from the nuclei whereas in the cellar only $1.1 \times 10^7$ crystals grew per ml. of solution. The radiation level in the cellar was about half the surface level.

EXAMPLE 3

The precipitations described in Examples 1 and 2 were repeated at the top and bottom of the 800 ft. shaft of the anhydrite mine at Billingham, Teesside. The radiation level in the mine is about one-third of the surface value. The nucleation of gypsum is reduced from $3.9 \times 10^7$ per ml. at the top of the shaft to $0.37 \times 10^7$ per ml. at the bottom. Lead sulphate is similarly changed from $4.5 \times 10^7$ per ml. to $0.47 \times 10^7$ per ml. down the mine.

EXAMPLE 4

Hydrogen peroxide will reduce the nucleation and therefore increase the crystal size of various salts, including gypsum, barium sulphate, lead chloride and lead sulphate. The special flasks described in Example 1 were filled with 5 ml. samples of the following pairs of precipitating reagents:

(a)
7 g. $Ca(NO_3)_2 4H_2O$ per 100 ml.
4 g. $Na_2SO_4$ per 100 ml.

(b)
0.6 g. $BaCl_2 \cdot 2H_2O$ per 100 ml.
0.4 g. $Na_2SO_4$ per 100 ml.

(c)
10 g. $Pb(NO_3)_2$ per 100 ml.
6 g. $BaCl_2 \cdot 2H_2O$ per 100 ml.

(d)
0.1 g. $Pb(NO_3)_2$ per 100 ml.
0.4 g. $Na_2SO_4$ per 100 ml.

The first named member of each pair of solutions contained, besides the precipitant, a known and varied amount of hydrogen peroxide. Many precipitations of each salt were performed in a similar fashion to Example 1 but under normal background radiation conditions to determine the effect of peroxide on nucleation. The results are displayed in FIG. IV. Up to ten-fold increases in crystal weight are attainable.

EXAMPLE 5

The precipitation of gypsum in the presence of various concentrations of ferrous iron was examined. The reagent solutions and mixing technique were similar to those described in Example 1 except for solution B in which a variable amount of ferrous sulphate ($FeSO_4$ anh.) was substituted on a molar basis for some of the sodium sulphate. Solution B was also made up in 0.0005 normal hydrochloric acid to prevent hydrolysis of the iron. The effect of ferrous iron as a nucleation reducing agent is illustrated in FIG. V($a$) at background radiation level.

EXAMPLE 6

The precipitation of gypsum in the presence of three similar nucleation inhibitors has been studied. The additives were hydroxylamine hydrochloride ($NH_2OH \cdot HCl$); hydrazine hydrochloride ($N_2H_2 \cdot HCl$); and hydrazine hydrate ($N_2H_4 \cdot H_2O$). The precipitating solutions were the same as solutions A and B in Example 1. The additives were dissolved in water and several solutions of each containing up to 5% w./v. were standardised. The precipitations were performed using the special mixing flasks described in Example 1, containing 5 ml. of solution B in the centre tube 1 and 5 ml. of solution A mixed with 5 ml. of the additive solution in the outer region 3. The reductions in the numbers of crystals are displayed in FIG. V($b$), ($c$) and ($d$) (again under normal background radiation conditions).

EXAMPLE 7

Under ambient radiation conditions samples of gypsum were precipitated similarly to Example 6. 10 ml. of solution B prepared as in Example 1 was contained in the centre tube 1 of a special flask as described in Example 1, and the annular space 3 held 10 ml. of solution A mixed with 5 ml. of an aqueous isopropanol solution. The alcohol solutions were of such concentrations that the final mixed reagents contained up to 10% by volume of the alcohol. The mixing and counting were completed as in Examples 1 and 6 and the results are displayed in FIG. VI. It will be observed that in quantities of up to 4% by volume, the alcohol acted as a scavenger and reduced the crystal count. Thereafter it had the effect of reducing the solubility of the gypsum in water and therefore increased the crystal count.

EXAMPLE 8

The crystallisation of sodium chloride from water was examined. Solutions were saturated at 70° C. in distilled water, filtered and superheated by 10° C. for ten minutes to dissolve any remaining traces of solid. Two such samples were allowed to cool to 22° C.; one under ambient radiation conditions and one in a radiation shield which reduced the $\gamma$-ray intensity to about a third of normal. The concentrations of crystals obtained were respectively 4 and 1.8 per ml. Other samples were allowed to cool in the presence of varying amounts of hydroxylamine hydrochloride (which had been dissolved in the distilled water before saturation with sodium chloride). The effect of hydroxylamine hydrochloride on the nucleation of sodium chloride is given in FIG. VII($a$). A reduction of up to 100 times is possible under these conditions.

EXAMPLE 9

The crystallisation of urea ($CO(NH_2)_2$) from methanol ($CH_3OH$) was studied by a similar technique to Example 8. Solutions were saturated at 35° C. and, after filtering, superheated 7° C. and then allowed to cool and crystallise. The samples which were cooled under ambient radiation and under reduced radiation conditions produced respectively 10 and 0.02 crystals per ml. The effect of hydroxylamine hydrochloride on the nucleation of urea from methanol is shown in FIG. VII($b$). A reduction in nucleation of up to 500 times is possible by radiation shielding.

EXAMPLE 10

Certain substances react extremely rapidly with hydroxyl radicals in solution and can thereby affect the amount of nucleation occurring in a system at a much lower concentration than other radical scavengers. Two examples of such substances are phenol and the ferrocyanide ion.

The effect of phenol on the nucleation of lead sulphate was examined. The reagent solutions and mixing techniques used were the same as in Example 2. The addition of 250 parts of phenol per million of solution reduced the crystal count from $44 \times 10^6$ per ml. to $1.3 \times 10^6$ per ml. FIG. IX shows the effect of various additions of phenol to lead sulphate precipitations at half the lead nitrate and sodium sulphate concentrations given in Example 2.

In the precipitation of barium sulphate where the conditions were the same as for Example 4(b), 500 parts of ferrocyanide ion per million of solution reduced the crystal count from $55 \times 10^6$ ml. to $11 \times 10^6$ per ml. It is possible to select very active nucleation control agents from a knowledge of their rates of reaction with the hydroxyl radical.

EXAMPLE 11

Examples 1 to 7 hereinabove have related to the relatively fast production of a high supersaturation by a rapid mixing technique. When the supersaturation is produced more slowly, for example, by adding one reagent solution slowly to the other, different results may be obtained.

FIG. VIII shows firstly the effect of varying the total time of mixing for equal volumes of 0.00028 molar solutions of lead nitrate and sodium sulphate.

It can be seen that the higher ambient radiation condition always produces more crystals. Also illustrated in this figure is a similar experiment in which barium phosphate was precipitated by the slow addition of a barium chloride dihydrate solution (3.14 g. per 100 ml.) to a sodium monohydrogen orthophosphate solution (1.877 g. per 100 ml.). With this system, when the total time of addition exceeds 80 seconds the higher level of radiation produces *fewer* crystals.

Among the other precipitates which also show this inversion effect are calcium and strontium carbonates; calcium, ferrous and strontium oxalates; and barium fluoride.

EXAMPLE 12

The effect of ionising radiation on the formation of zinc phosphate crystals in metal pretreatment, as observed in the following experiment, shows that there is a statistical correlation between the crystal size and the level of incident ionising radiation.

Clean degreased mild steel panels were immersed in a commercially available nitrite accelerated calcium-modified zinc phosphate solution which was supplied for application by dipping; the solution was at 64–65° C. The panels were kept immersed in the solution for 5 minutes at this temperature under unstirred conditions, after which time they were removed, rinsed, and dried in a current of warm air.

A similar set of panels was prepared using a similar zinc phosphate solution to which had been added labelled phosphoric acid ($P^{32}$) (phosphorus isotope atomic weight 32) such that the concentration in the solution was $2.62 \times 10^{-2}$ microcuries per millilitre. The calculated radiation level at the surface of the panel was $4.6 \times 10^3$ $\beta$ particles/minute/cm.$^2$.

After treatment of the panels in the radioactive solution, and subsequent rinsing and drying as above, the panels were allowed to stand in order that the activity might decay.

A comparison of the size of the crystals in both sets of panels was made by the study of photomicrographs, and it was seen that the crystals on the set of panels exposed to the labelled phosphoric acid were significantly smaller than those on the panels not so exposed.

EXAMPLE 13

The effect of (a) ionising radiation and (b) added hydrogen peroxide on the nucleation of silver halides was examined by repeating the experiments and using the special flasks described in Examples 1 and 4 hereinabove. The following pairs of reactants were examined:

(a)

| A solution (5 ml.) | B solution (5 ml.) | Precipitate |
|---|---|---|
| 0.02 M $AgNO_3$ | 0.021 M KBr | AgBr |
| 0.002 M $AgNO_3$ | 0.0021 M KBr | AgBr |
| 0.002 M $AgNO_3$ | 0.0021 M KI | AgI |

Rapid precipitation was obtained by inverting the flasks. All three systems exhibited a very sharp increase in crystal size when the ionising radiation level was reduced by lead screening to about ½ to ⅕ of its normal background level.

(b) The same three pairs of reactants were used, except that the solutions B contained added hydrogen peroxide in amounts varying from 0.2% to 1.8% w./v. of the final solution, and over this range crystal size was found to increase with hydrogen peroxide concentration. The above results bear out those obtained in Examples 1 and 4 hereinabove.

As stated hereinabove, the foregoing examples are by no means exhaustive, and other applications of the invention include the crystallisation of urea from dimethylformamide, naphthalene from chloroform, and ammonium sulphate and salt from aqueous solutions.

The invention is of particular value in the field of single crystal growth in the electronics industry, since the addition of scavengers and/or the use of adequate shielding reduces the possibility of the formation of extra nuclei in the system wherein the single crystal is being grown. This technique makes it possible to speed up the somewhat tedious growth process, since it discourages the formation of unwanted nuclei.

What is claimed is:

1. Method of crystallising crystals from an aqueous solution of crystallisable water-soluble solids wherein the number and size of crystals are predictably varied comprising maintaining the concentration of free OH radicals produced by ionising irradiation in the aqueous solution to a concentration thereof corresponding to an ionising radiation dose rate of between 0.005 to 0.001 mrads./hr. by at least one step of radiation shielding the said solution and adding to the said solution a scavenger for the said OH radical products of ionising radiation, whereby the number of crystals which are crystallised from the aqueous solution is predictably varied as a direct function and the size of crystals is predictably varied as an inverse function of the said concentration within said range of the said OH radical products of ionising radiation.

2. Method according according to claim 1 where the ionising radiation is reduced by radiation shielding of the said solution.

3. Method according to claim 1 wherein the said products of ionising radiation are reduced by adding to the said solution a scavenger for the said OH radical products of ionising radiation.

4. Method according to claim 2 wherein the concentration of said free OH radical products of ionising radiation is adjusted by adding to the solution additional said products of ionising radiation.

5. Method according to claim 4 wherein the additional products of radiation are generated in situ in the solution.

6. Method as claimed in claim 1, wherein said radiation dose is between 0.0015 and 0.005 mrads./hr.

7. Method as claimed in claim 2, which comprises the step of providing at least one additional source of ionising radiation within the solution itself.

8. Method as claimed in claim 3, wherein said scavengers are substances which react with free OH radicals by hydrogen removal therefrom.

9. Method as claimed in claim 8, wherein said scavengers are selected from hydrogen peroxide, hydrazine, hydroxylamine, and their salts, and secondary alcohols.

10. Method as claimed in claim 9, wherein said scavenger is iso-propanol.

11. Method as claimed in claim 5, wherein said free OH radicals are within the solution by solvent photolysis.

12. Method as claimed in claim 5, wherein said additional products of irradiation are generated by the formation of free OH radicals by far U.V. photolysis.

13. Method as claimed in claim 5, wherein said additional products of irradiation are generated by the photolysis of added sensitisers.

14. Method as claimed in claim 5, wherein said additional products of irradiation are generated by the thermal decomposition of added sensitisers.

15. Method as claimed in claim 13, wherein said added sensitisers are selected from hydrogen peroxide and organic peroxides.

16. Method as claimed in claim 5, wherein said additional products of irradiation are generated by chemical reaction between pairs of added sensitisers selected from ferrous ion and hydrogen peroxide.

17. Method as claimed in claim 7, wherein said internally-provided additional source of ionising radiation comprises at least one lattice of radiation sources.

18. Method as claimed in claim 17, wherein said internally-provided additional source of ionising radiation comprises cobalt-60.

19. Method as claimed in claim 7, wherein said internally-provided additional source of ionising radiation comprises a trace of at least one radioactive element.

20. Method as claimed in claim 3, wherein said scavengers are substances which can easily transfer an electron to a free OH radical.

21. Method as claimed in claim 20, wherein said scavengers are selected from the ions $Fe(CN)_6^{4-}$, $Fe^{2+}$, $I^-$, and $NO_2^+$.

22. Method as claimed in claim 20, wherein said scavengers are selected from compounds of the lower states of variable valency elements and their salts.

23. Method as claimed in claim 22, wherein said variable valency elements are selected from the transition metals and their salts.

24. Method as claimed in claim 23, wherein said variable valency elements are selected from iron, cerium and titanium and their salts.

25. Method as claimed in claim 3, wherein said scavengers are substances which react by addition to a free OH radical.

26. Method as claimed in claim 25, wherein said scavengers are selected from phenol, quinol, and derivatives thereof.

References Cited

UNITED STATES PATENTS

| | | | |
|---|---|---|---|
| 2,876,083 | 3/1959 | Prietl | 23—295 |
| 2,937,981 | 5/1960 | Allen et al. | 204—157.1 X |
| 3,092,561 | 6/1963 | Lampe | 204—157.1 |
| 3,434,949 | 3/1969 | Jones et al. | 204—157.1 |
| 3,445,209 | 5/1969 | Asunmaa | 204—157.1 X |

FOREIGN PATENTS

| | | | |
|---|---|---|---|
| 758,731 | 1/1934 | France | 23—295 |

DANIEL E. WYMAN, Primary Examiner

P. E. KONOPKA, Assistant Examiner

U.S. Cl. X.R.

23—1 R, 87, 89, 109, 122, 127, 300 301 R; 204—157.1 H, 158 R, 158 HE; 260—555